(12) United States Patent
Donoho et al.

(10) Patent No.: US 6,601,879 B2
(45) Date of Patent: Aug. 5, 2003

(54) PLASTIC FITTING FOR FLARED TUBING

(75) Inventors: James Donoho, Delano, MN (US); Michael Stoick, Prior Lake, MN (US); Eric Soderstrom, Lauderdale, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/108,202

(22) Filed: Mar. 26, 2002

(65) Prior Publication Data

US 2002/0171242 A1 Nov. 21, 2002

Related U.S. Application Data

(63) Continuation-in-part of application No. 09/590,328, filed on Jun. 8, 2000, now abandoned.

(51) Int. Cl.[7] .............................................. F16L 25/00
(52) U.S. Cl. .................. 285/334.5; 285/423; 285/331; 285/353
(58) Field of Search ........................ 285/334.5, 331, 285/354, 353, 423; 29/890.144

(56) References Cited

U.S. PATENT DOCUMENTS

| | | | | |
|---|---|---|---|---|
| 1,058,542 A | * | 4/1913 | Brown | 285/332.4 |
| 2,123,999 A | * | 7/1938 | Lauer | 285/332.1 |
| 2,547,889 A | * | 4/1951 | Richardson | 285/331 |
| 2,737,403 A | * | 3/1956 | Ellis | 285/334.2 |
| 3,278,206 A | * | 10/1966 | Wooding | 285/334.5 |
| 5,154,453 A | * | 10/1992 | Nishio | 285/342 |
| 5,388,871 A | * | 2/1995 | Saitoh | 285/247 |
| 6,089,621 A | * | 7/2000 | Nishio | 285/331 |
| 6,409,222 B1 | * | 6/2002 | Donoho et al. | 285/93 |

* cited by examiner

Primary Examiner—Eric K. Nicholson
(74) Attorney, Agent, or Firm—Patterson, Thuente, Skaar & Christensen, P.A.

(57) ABSTRACT

A plastic fitting couples a section of tubing with a concave flared end to a fitting body. In a preferred embodiment, the flared tube has an expanded s-shape in the cross-section and the plastic fitting generally comprises a fitting body and a fitting nut. The fitting body includes an internal nose section having a curvilinear sidewall and a cylindrical surface that have been preformed to substantially match in shape the flare of the tubing. In a preferred embodiment, the nut has external threads that engage internal threads on the fitting body. The fitting nut is threadably coupled to the fitting body and includes a flare-engaging collar which secures the flared end of the tubing to the fitting body through a circumferential point contact. Additional securement of the tubing is provided by an axially inset annular recess, proximate the tapered nose section, which defines a seat sized to receive the end edge of the tube.

10 Claims, 2 Drawing Sheets

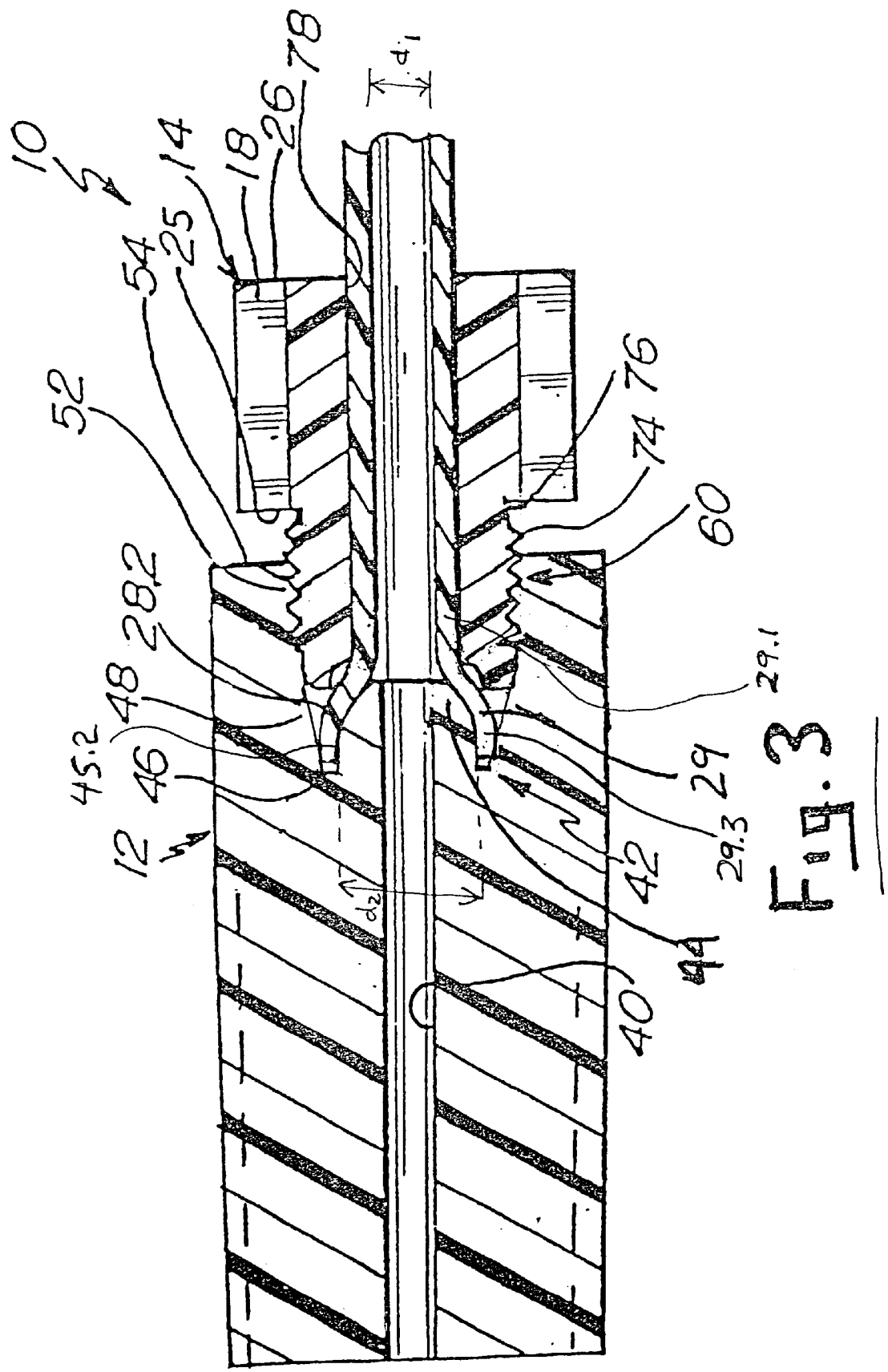

PLASTIC FITTING FOR FLARED TUBING

PRIORITY APPLICATION

This application is a continuation-in-part of and claims benefit of U.S. patent application Ser. No. 09/590,328, filed Jun. 8, 2000 now abandoned, which is incorporated herein by reference.

FIELD OF THE INVENTION

The present invention relates to plastic fittings and, more particularly, to plastic fittings for creating a sealed and enclosed environment around the pre-flared end of a section of plastic tubing.

BACKGROUND OF THE INVENTION

Numerous industries use tubing and fittings of fluoroplastics, e.g., polytetrafluoroethylene (PTFE), perfluoroalkoxy (PFA), and other synthetic resins, for the transfer of various fluids in extreme temperatures and conditions. These fluoroplastic fittings offer extraordinary corrosion resistance and high purity which make the materials ideal for the semiconductor processing industry. However, such plastic fittings and tubings, in that they are made of plastic rather than traditional materials such as stainless steel, bronze and copper, do not have the rigidity and strength of conventional fittings. Thus particular connection configurations that may work very well with metal fittings and metal tubing, do not work adequately when made from fluoropolymer materials. To maintain a clean and non-hazardous process it is essential that the fittings provided for coupling sections of tubing are not easily disconnected and that the integrity of tubing/fitting interface is maintained. Various types of fluoropolymer fittings have been provided for these purposes.

One standard type of fitting known as FLARETEK® fitting, available from the assignee of this application, provides for a fitting body, having a nose with a rounded tip and cylindrical section, and a threaded portion at the base of the nose. A fitting nut is typically placed on the tubing before the tubing end is flared. The end portion of tubing with the flared end is placed over the nose section and the fitting nut is slid over and secured to the fitting body axially compressing the flared end on the nose by the collar of the nut creating a seal between the inside surface of the tubing and nose. When assembled the nut extends completely over the flared section. The seal is created around the substantially cylindrical nose but is principally at the tip of the nose. In these fittings, the inside diameter of the flared section is slightly greater that the outside diameter of the non-flared portion of the tubing. The tubing flare forms an exaggerated s-shape with the flared section axially extending and having a constant diameter. The flare is formed by heating the end of the tubing and expanding same on an appropriately shaped form.

Such flared fitting bodies have the nose portion including the portions which seal exposed when they are unassembled subjecting the fitting bodies to potential damage. Similarly, the exterior threads are also exposed subjecting them to possible damage. However in certain applications it would be desirable to have a flared fitting that offers further advantages such as additional secondary sealing, a fitting in which the sealing surfaces of fitting body are not exposed when the fitting is unassembled, and moreover that provides more protection to the sealing components when assembled.

SUMMARY OF THE INVENTION

A plastic fitting couples a section of tubing with a concave flared end to a fitting body. In a preferred embodiment, the flared tube has an expanded s-shape in the cross-section and the plastic fitting generally comprises a fitting body and a fitting nut. The fitting body includes an internal nose section having a curvilinear sidewall and a cylindrical surface that have been preformed to substantially match in shape the flare of the tubing. In a preferred embodiment, the nut has external threads that engage internal threads on the fitting body. The fitting nut is threadably coupled to the fitting body and includes a flare-engaging collar which secures the flared end of the tubing to the fitting body through a circumferential point contact. Additional securement of the tubing is provided by an axially inset annular converging recess, proximate the tapered nose section, which defines a seat sized to receive the end edge of the tube.

During assembly, the flared end of the tubing with the fitting nut thereon is placed over the nose section of the fitting body. The fitting nut is rotated and drawn towards the fitting body by virtue of interfacing threads. As the fitting nut is drawn closer to the fitting body, the flare-engaging collar operates to axially compress the flared end of the tubing on the nose as well as axially seat the edge portion of the flared end into the axially inset converging annular seat.

Both the fitting body and fitting nut are designed for easy grasping and, thus, assembly of the plastic fitting. The fitting body is preferably provided with one or more planar surfaces for easier grasping while the fitting nut is preferably provided with a number of winged extensions for easier grasping. The fitting body may be integral or part of a component or device, such as a valve, or may have connection means such as external threads, another flared end fitting, or a flange.

A feature and advantage of the invention is that redundant sealing connections are provided. The flared end of the tubing seals against the curvilinear portion of the tapered nose as effected by the tightening of the nut. The flared end also seals against the cylindrical surface of the tapered nose. This sealing is not directly dependant upon the tightness of the nut in the fitting. Additionally, in a preferred embodiment, the tip of the flared end seals into a converging annular recess.

BRIEF DESCRIPTION OF THE DRAWINGS

FIG. 3 is a cross-sectional view of the plastic fitting of FIG. 1. taken along line 3—3 of FIG. 2.

DETAILED DESCRIPTION OF THE PREFERRED EMBODIMENTS

Figure 1:
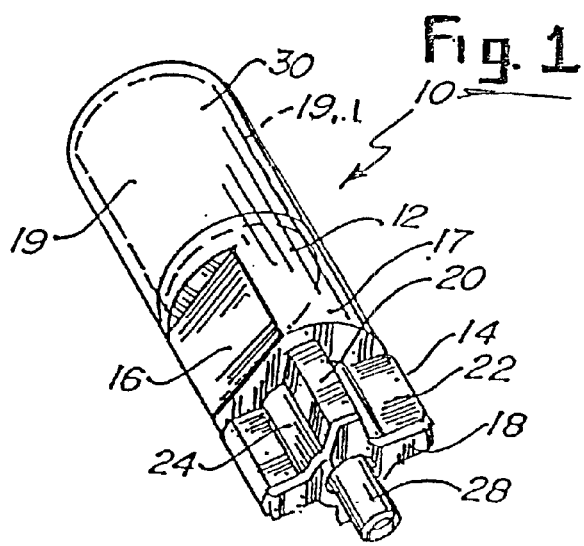
FIG. 1 is a perspective view of a plastic fitting for flared tubing of the present invention.
Figure 2:
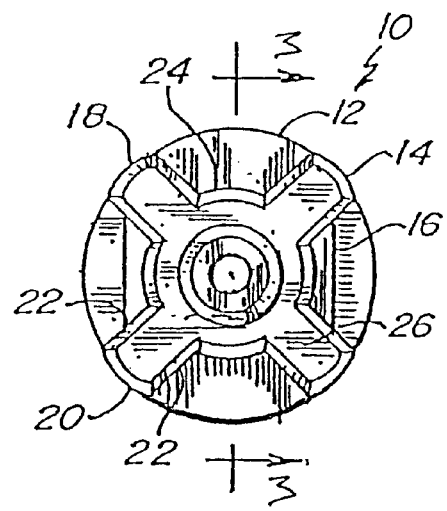
FIG. 2 is a front plan view of the plastic fitting of FIG. 1.

A plastic fitting 10 for flared tubing of the present invention is depicted in FIGS. 1–4. Specifically, referring to FIGS. 1 and 2, plastic fitting 10 generally comprises a fitting body (or first coupling means) 12 and a fitting nut (or second coupling means) 14, which is shown fastened to fitting body 12. Those exterior portions of fitting nut 14 and fitting body 12 not concealed by virtue of the fastening of fitting nut 14 to fitting body 12 may be appreciated herewith. Specifically, the non-concealed portion of the exterior of fitting body 12 is generally cylindrical in shape and preferably incorporates one or more planar surfaces 16 for easier grasping of fitting body 12 during assembly. The fitting has a first end 17 for receiving the flared tubing and nut and second end 19 which is illustrated as a threaded nipple with the dashed lined representing the threads 19.1.

Figure 4:
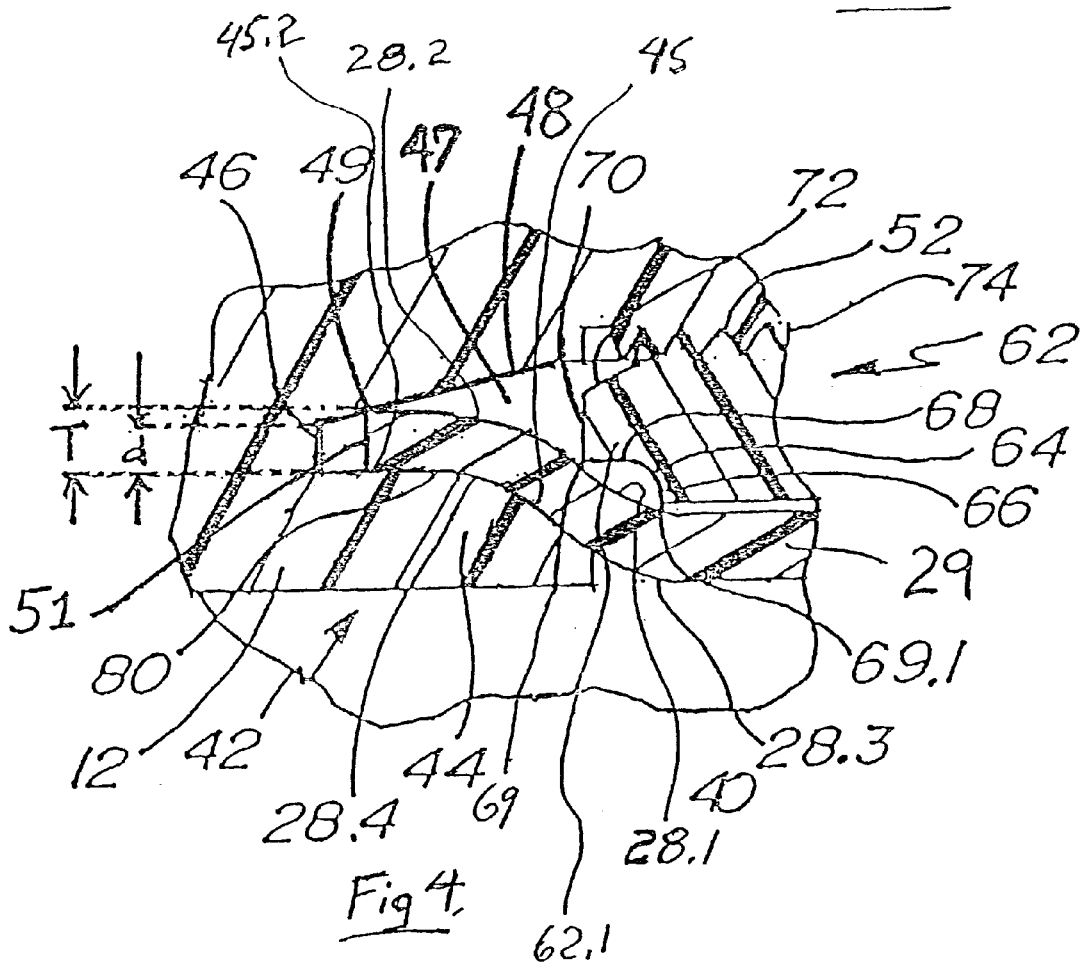
FIG. 4 is a detailed cross-section view of a sealing portion of the plastic fitting of FIG. 3.

The tubing 28 must be prepared by flaring prior to the fitting process. As best shown in FIG. 3, the flared end 29 has an exterior surface has a concave region 28.1 which transitions to a convex region 28.2. Similarly the interior surface of the flared portion has a convex region 28.3 and a concave region 28.4. FIG. 4. The flared end 29 is formed prior to engaging the fitting body 12 by heating and shaping said tube 28 on a form (not shown). The flared end has a first tubing portion 29.1 with a first tubing diameter $d_1$, a curvilinear transition portion 29.2, a second tubing portion 29.3 with a second tubing diameter $d_2$. The first tubing portion is concentric with the second tubing portion.

The non-concealed portion of the exterior of fitting nut 14 is also generally cylindrical in shape but is provided with rotation means, for example, configured as a plurality of winged extensions 18, which provide for easier grasping and torquing of fitting nut 14 during assembly of fitting 10. Each winged extension 18 generally comprises an elongate, substantially planar top face 20 and a pair of elongate, substantially parallel and planar side faces 22 that extend substantially perpendicularly from planar top face 20. Further defining the exterior of fitting nut 14 are a plurality of elongate separator faces 24 that are positioned between opposite side faces 22 of adjacent winged extensions 18 and a pair of substantially parallel end faces 25, 26. Other rotation means may be utilized such as tool interfaces, flats, knurled or textured surfaces.

Referring to FIG. 3, a cross-sectional view of fitting 10 is provided illustrating the interior configuration of fitting body 12 and fitting nut 14. As shown, fitting body 12 is preferably of a unitary configuration having a flow conduit configured as a central bore 40 extending therethrough and an inner body portion 42. Inner body portion 42 comprises a tapered nose section nose section 44 that is defined by the central bore 40 and the convex curvilinear side wall 45 and cylindrical surface 45.2. Moving radially outward, inner body portion 42 further has an annular recess 47 that extends to stop wall 46 that is substantially perpendicular to the central bore 40 and that connects the curvilinear sidewall 45 with an angular wall 48. Angular wall 48, which is preferably provided at an acute angle, e.g., 30 degrees, to stop wall 46. Stop wall 46, separating curvilinear side wall 45 and angular wall 48, defines an axially extending and converging annular recess 47 with a radial gap that converges to a tubing seat 49 appropriately sized for the thickness of the second portion of tubing 28 that is placed over tapered nose section 44. In a preferred embodiment the annular recess 47 converges at stop wall 46 to a dimension d less than the thickness T of the tubing wall so that a seal is created at tubing seat 49. Angular wall 48 is connected via a substantially cylindrical section to a threaded side portion 52 of inner body portion 42. Threaded side portion 52 extends to the exterior of fitting body 12 and connects with the fitting end 54.

Fitting nut 14, like fitting body 12, is also preferably of a unitary configuration, and incorporates a proximal portion 60. Proximal portion 60 is preferably defined by an annular collar 62. Collar 62 includes a "C" shaped engagement portion 62.1 with a concave corner section 64 defined by a radial leg 66 and an axial leg 68, a flare engaging corner 69, and a base engaging corner 69.1. Collar 62 further includes a nose 70 connected to threaded section 74 by way of angular face 72. Threaded exterior portion 74 is designed to interface with threaded interior portion 62 of fitting body 12. Proximal fitting portion 60 further includes a recessed, annular void 76 that is intermediate threaded side portion 74 and winged extensions 18. Fitting nut 14 further comprises a central bore 78 that extends from collar 62 to the exterior of the fitting at end face 26.

In securing plastic fitting 10 to tubing 28, flared end 29 of tubing 28 is preferably manually placed over tapered nose section 44 of fitting body 12 while the non-flared end of tubing 28 is preferably inserted through central bore 78 of fitting nut 14. Where the non-flared end of the tubing section is not readily accessible or is part of a component or will not receive the nut, said nut would be put on the tubing section prior to the flaring process. Fitting nut 14 is then pushed towards fitting body 12 until threaded side portion 74 of fitting nut 14 contacts threaded side portion 52 of fitting body 12. Fitting nut 14 is preferably then rotated by the rotating means such that the threads of fitting body 12 and fitting nut 14 act to draw fitting nut 14 towards fitting body 12.

As fitting nut 14 is drawn closer into fitting body 12, collar 62 of fitting nut 14 is pressed against flared end 29 of tubing 28 operating to pinch and secure the inner side of the flared end 29 of tubing 28 against curvilinear side wall 45 thereby effecting a continuous seal. The flare engaging corner 69 of collar 62 provides a compressive force on the flared end of the tubing 28 at the tapered nose interface 80. Due to the flare of the tube 29, the compressive force translates into an axial and a radial component. Flared end 29 is additionally secured by virtue of the seating of the tube tip 51 of flared end 29 within annular space 47 at tubing seat 49. Moreover, the sizing of the second tubing portion in relation to the size of the cylindrical surface forms a cylindrical seal of which the integrity is largely independent of the tightness of the nut. Thus, an effective seal can be accomplished over a range of tightening torques providing for a safer more secure connection.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A combination of a plastic fluoropolymer fitting and a plastic fluoropolymer tube, the fitting for coupling to a flared end of the tube, said flared end having an elongated "S" shape in the cross section, the tubing having a first tubing portion of a first diameter integral with a curvilinear transition portion, and a second tubing portion having a wall thickness and a second diameter integral with the curvilinear transition portion and concentric with the first tubing portion, said fitting comprising:

a fitting body with a first end and a second end and a flow conduit extending therethrough, the first end having a recess with inwardly facing threads with a tapered nose section inset therein, the tapered nose section having a curvilinear side wall configured to cooperate with the curvilinear transition portion of the tubing, and wherein said tapered nose section further defines a converging annular recess with a radial gap that narrows toward said second end of the fitting body, said radial gap narrowing to a dimension less that the wall thickness of the second tubing portion;

a fitting nut operably joinable to said fitting body in the recess, said fitting nut having exterior threads sized to cooperate with the inwardly facing threads of the fitting body and a flare-engaging collar, the nut having a bore sized to slidingly fit on the first tubing portion, wherein the collar of said fitting nut has a pair of annular contact points with a gap therebetween, the collar configured to position on annular contact point to engage the flared end proximate the first tubing portion and the other annular contact point to engage the flared end on the curvilinear transition portion;

whereby upon tightening of the fitting nut into the recess of the fitting body with the flared end of the tubing therein, the second tubing portion seats and seals within the converging annular recess of the fitting body.

2. A combination of a plastic fluoropolymer fitting and a plastic fluoropolymer tube, the fitting for coupling to a flared end of the tube, said flared end having an elongated "S" shape in the cross section, the tubing having a first tubing portion of a first diameter integral with a curvilinear transition portion, and a second tubing portion having a wall thickness and a second diameter integral with the curvilinear transition portion and concentric with the first tubing portion, said fitting comprising:

a fitting body with a first end and a second end and a flow conduit extending therethrough, the first end having a recess with inwardly facing threads with a tapered nose section inset therein, the tapered nose section having a curvilinear side wall configured to cooperate with the curvilinear transition portion of the tubing, a fitting nut operably joinable to said fitting body in the recess, said fitting nut having exterior threads sized to cooperate with the inwardly facing threads of the fitting body and a flare-engaging collar, the collar having a pair of annular contact points with a gap therebetween and with the nut having a bore sized to slidingly fit on the first tubing portion;

whereby upon tightening of the fitting nut into the recess of the fitting body with the flared end of the tubing therein, the corner contacts the flared end and seals same against the curvilinear sidewall of the nose section.

3. The combination of claim 2 wherein the corner is defined by a pair of surfaces having an angle of less than 130 degrees taken in an axially extending cross-section.

4. The combination of claim 2 where the collar is configured to position one annular contact point to engage the flared end proximate the first tubing portion and the other annular contact point to engage the flared end on the curvilinear transition portion.

5. A combination of a plastic fluoropolymer fitting and a plastic fluoropolymer tube, the fitting for coupling to a flared end of the tube, said flared end having an elongated "S" shape in the cross section, the flared end of the tubing having a first tubing portion of a first diameter integral with a curvilinear transition portion, and a second tubing portion having a wall thickness and a second diameter integral with the curvilinear transition portion and concentric with the first tubing portion, said flared end having a contiguous interior smooth surface extending throughout said "S" shape, said fitting comprising:

a fitting body with a first end and a second end and a flow conduit extending therethrough, the first end having a recess with inwardly facing threads with a tapered nose section inset therein, the tapered nose section having a curvilinear side wall configured to cooperate with the curvilinear transition portion of the tubing and a cylindrical surface configured to engage with the second tubing portion of the flared end, a fitting nut operably joinable to said fitting body in the recess, said fitting nut having exterior threads sized to cooperate with the inwardly facing threads of the fitting body and a flare-engaging collar for engaging the flared end, the nut having a bore sized to slidingly fit on the first tubing portion;

whereby upon tightening of the fitting nut into the recess of the fitting body with the flared end of the tubing therein, the collar contacts the flared end and seals the flared end against the curvilinear sidewall and the cylindrical surface of the nose section.

6. The fluoropolymer fitting of claim 5 wherein the contact between the fitting nut and the flared end of the tube occurs in an annular ring proximate an annular corner portion of the flare engaging collar.

7. A method of coupling an end of a fluoropolymer tubing portion to a fluoropolymer fitting body comprising the steps of:

forming a flared end of the tubing with an s-shaped cross-section and having a first tubing portion of a first diameter integral with a curvilinear transition portion, and a second tubing portion having a wall thickness and a second diameter integral with the curvilinear transition portion and concentric with the first tubing portion by heating the tubing and inserting a form into the end of said tubing;

engaging exterior threads a a fitting nut with interior threads of the fitting body with the tubing extending through an aperture in the fitting nut;

axially moving the flared end into a continuous sealing engagement with a concave wall section of the fitting body by rotating the nut with respect to the fitting body with the nut engaged with the flared end whereby the second tubing portion engages and seals with a cylindrical surface on the fitting.

8. The method of claim 7 further comprising the step of seating a tip of the flared end into an annular axially extending recess in the fitting body.

9. The method of claim 7 further comprising the step of applying circumferential pressure to the exterior surface of the flared end with an annular corner portion of the fitting nut.

10. The combination of claim 1 wherein said second tubing portion seats and seals within the converging annular recess of the fitting body at an inner surface of the tubing end and at an outer surface of the tubing end.

* * * * *